US007306520B2

(12) United States Patent
Kaminkow et al.

(10) Patent No.: US 7,306,520 B2
(45) Date of Patent: Dec. 11, 2007

(54) GAMING DEVICE INCLUDING MOVABLE SYMBOL INDICATOR PLATES

(75) Inventors: Joseph E. Kaminkow, Reno, NV (US); Jamie J. Goins, Reno, NV (US)

(73) Assignee: IGT, Reno, NV (US)

( * ) Notice: Subject to any disclaimer, the term of this patent is extended or adjusted under 35 U.S.C. 154(b) by 588 days.

(21) Appl. No.: 10/458,444

(22) Filed: Jun. 9, 2003

(65) Prior Publication Data

US 2004/0248640 A1 Dec. 9, 2004

(51) Int. Cl.
*A63F 13/00* (2006.01)

(52) U.S. Cl. .......................................................... 463/20

(58) Field of Classification Search .................. 463/20, 463/25, 31, 16–19, 21–22; 273/143 R, 138.2
See application file for complete search history.

(56) References Cited

U.S. PATENT DOCUMENTS

| | | | |
|---|---|---|---|
| 1,978,395 | A | 10/1934 | Groetchen |
| 2,077,124 | A | 4/1937 | Miller et al. |
| 3,420,525 | A | 1/1969 | Waders |
| 3,642,287 | A | 2/1972 | Lally et al. |
| 3,645,531 | A | 2/1972 | Wright |
| 3,735,987 | A | 5/1973 | Ohki |
| 4,198,052 | A | 4/1980 | Gauselmann |
| 4,326,351 | A | 4/1982 | Heywood et al. |
| 4,346,900 | A | 8/1982 | Lamlee |
| 4,448,419 | A | 5/1984 | Telnaes |
| 4,492,378 | A | 1/1985 | Williams |
| 4,695,053 | A | 9/1987 | Vazquez, Jr. et al. |
| 4,826,169 | A | 5/1989 | Bessho et al. |
| 5,152,529 | A | 10/1992 | Okada |
| 5,184,821 | A | 2/1993 | Korenek |

(Continued)

FOREIGN PATENT DOCUMENTS

| | | |
|---|---|---|
| DE | 19873709026 | 9/1988 |

(Continued)

OTHER PUBLICATIONS

Slot Machines: A Pictorial History of the First 100 Years, Marshall Fey, Published in 1997.

(Continued)

*Primary Examiner*—Kim Nguyen
(74) *Attorney, Agent, or Firm*—Bell, Boyd & Lloyd LLP

(57) ABSTRACT

A gaming device including a first and second indicator plate which are adjacent to each other and on the same axis where the second plate overlaps at least a portion of the first plate and the first and second plates are in different planes. In one embodiment, the first plate includes at least one symbol where one or more awards are associated with the symbol. The second plate is composed of a substantially transparent material, which enables a player to see through at least a portion of the second plate to view one or more symbols on the first plate. The second plate also includes a plurality of sections, which indicate one or more symbols on the first plate. In one embodiment, the gaming device enables a player to select one or more of the sections on the second plate to indicate a symbol or symbols on the first plate.

69 Claims, 9 Drawing Sheets

U.S. PATENT DOCUMENTS

| | | | |
|---|---|---|---|
| 5,188,363 A | 2/1993 | Marnell, II et al. | |
| 5,259,616 A | 11/1993 | Bergmann | |
| 5,292,127 A | 3/1994 | Kelly et al. | |
| 5,364,100 A | 11/1994 | Ludlow et al. | |
| 5,395,111 A | 3/1995 | Inoue | |
| 5,536,016 A | 7/1996 | Thompson | |
| 5,553,851 A | 9/1996 | Malavazos et al. | |
| 5,580,309 A | 12/1996 | Piechowiak et al. | |
| 5,584,763 A | 12/1996 | Kelly et al. | |
| 5,584,764 A | 12/1996 | Inoue | |
| 5,639,089 A | 6/1997 | Matsumoto et al. | |
| 5,647,798 A | 7/1997 | Falciglia | |
| D392,340 S | 3/1998 | DeSimone | |
| 5,752,881 A | 5/1998 | Inoue | |
| 5,755,619 A | 5/1998 | Matsumoto et al. | |
| 5,775,692 A | 7/1998 | Watts et al. | |
| 5,788,573 A | 8/1998 | Baerlocher et al. | |
| 5,823,874 A | 10/1998 | Adams | |
| 5,848,932 A | 12/1998 | Adams | |
| 5,879,235 A | 3/1999 | Kaneko et al. | |
| 5,882,261 A | 3/1999 | Adams | |
| 5,911,418 A | 6/1999 | Adams | |
| D412,347 S | 7/1999 | DeSimone et al. | |
| 5,947,820 A | 9/1999 | Morro et al. | |
| 5,951,397 A | 9/1999 | Dickinson | |
| 5,980,384 A | 11/1999 | Barrie | |
| 5,984,782 A | 11/1999 | Inoue | |
| 6,004,207 A | 12/1999 | Wilson, Jr. et al. | |
| 6,015,346 A | 1/2000 | Bennett | |
| 6,027,115 A | 2/2000 | Griswold et al. | |
| 6,033,307 A | 3/2000 | Vancura | |
| 6,039,649 A | 3/2000 | Schulze | |
| 6,039,976 A | 3/2000 | Mehra et al. | |
| 6,059,289 A | 5/2000 | Vancura | |
| 6,059,658 A | 5/2000 | Mangano et al. | |
| 6,082,734 A | 7/2000 | Uehara et al. | |
| 6,086,066 A | 7/2000 | Takeuchi et al. | |
| 6,089,978 A | 7/2000 | Adams | |
| 6,095,921 A * | 8/2000 | Walker et al. | 463/20 |
| 6,102,798 A | 8/2000 | Bennett | |
| 6,105,962 A | 8/2000 | Malavazos et al. | |
| 6,117,009 A | 9/2000 | Yoseloff | |
| 6,142,873 A | 11/2000 | Weiss et al. | |
| 6,149,156 A | 11/2000 | Faela | |
| 6,159,098 A | 12/2000 | Slomiany et al. | |
| 6,162,121 A | 12/2000 | Morro et al. | |
| 6,168,520 B1 | 1/2001 | Baerlocher et al. | |
| 6,190,255 B1 | 2/2001 | Thomas et al. | |
| 6,217,022 B1 | 4/2001 | Astaneha | |
| 6,224,483 B1 | 5/2001 | Mayeroff | |
| 6,231,442 B1 | 5/2001 | Mayeroff | |
| 6,302,790 B1 | 10/2001 | Brossard | |
| 6,309,299 B1 | 10/2001 | Weiss | |
| 6,309,300 B1 | 10/2001 | Glavich | |
| 6,315,663 B1 | 11/2001 | Sakamoto | |
| 6,315,664 B1 | 11/2001 | Baerlocher | |
| 6,319,124 B1 | 11/2001 | Baerlocher et al. | |
| 6,322,309 B1 | 11/2001 | Thomas et al. | |
| 6,334,814 B1 | 1/2002 | Adams | |
| 6,336,863 B1 | 1/2002 | Baerlocher et al. | |
| 6,343,988 B1 | 2/2002 | Walker et al. | |
| 6,364,767 B1 * | 4/2002 | Brossard et al. | 463/20 |
| 6,375,187 B1 | 4/2002 | Baerlocher | |
| 6,386,974 B1 | 5/2002 | Adams | |
| 6,398,220 B1 | 6/2002 | Inoue | |
| 6,439,995 B1 | 8/2002 | Hughs-Baird | |
| D462,397 S | 9/2002 | Baker et al. | |
| 6,464,582 B1 | 10/2002 | Baerlocher et al. | |
| 6,506,117 B2 | 1/2003 | DeMar et al. | |
| 6,506,118 B1 | 1/2003 | Baerlocher et al. | |
| D473,270 S | 4/2003 | Seelig et al. | |
| 6,572,473 B1 | 6/2003 | Baerlocher | |
| 6,589,114 B2 | 7/2003 | Rose | |
| 6,659,864 B2 | 12/2003 | McGahn et al. | |
| 6,726,204 B2 | 4/2004 | Inoue | |
| 6,988,731 B2 * | 1/2006 | Inoue | 273/142 H |
| 2003/0040355 A1 | 2/2003 | Baelocher | |
| 2003/0060277 A1 | 3/2003 | Webb eta l. | |
| 2003/0064796 A1 | 4/2003 | Glavich et al. | |
| 2003/0190957 A1 | 10/2003 | Tanskanen | |
| 2004/0012145 A1 | 1/2004 | Inoue | |
| 2004/0014516 A1 | 1/2004 | Inoue | |
| 2004/0014517 A1 | 1/2004 | Inoue | |
| 2004/0018866 A1 | 1/2004 | Inoue | |
| 2004/0026854 A1 | 2/2004 | Inoue | |
| 2004/0036218 A1 | 2/2004 | Inoue | |
| 2004/0038726 A1 | 2/2004 | Inoue | |

FOREIGN PATENT DOCUMENTS

| | | |
|---|---|---|
| DE | 10026366 | 10/2001 |
| EP | 1 184 822 | 3/2002 |
| EP | 1 653 416 | 5/2006 |
| GB | 2 062 922 A | 5/1981 |
| GB | 2 090 690 A | 7/1982 |
| GB | 2 0 96 376 A | 10/1982 |
| GB | 2 097 160 A | 10/1982 |
| GB | 2 100 905 A | 1/1983 |
| GB | 2 105 891 A | 3/1983 |
| GB | 2 117 155 A | 10/1983 |
| GB | 2 137 392 A | 10/1984 |
| GB | 2 161 008 A | 1/1986 |
| GB | 2 170 636 A | 8/1986 |
| GB | 2 181 589 A | 4/1987 |
| GB | 2 183 882 A | 6/1987 |
| GB | 2 191 030 A | 12/1987 |
| GB | 2 222 712 A | 3/1990 |
| GB | 2 225 889 A | 6/1990 |
| GB | 2 226 436 A | 6/1990 |
| GB | 2 242 300 A | 9/1991 |
| GB | 2 262 642 A | 6/1993 |
| GB | 2 322 217 | 12/1997 |
| GB | 2 201 821 | 9/1998 |
| WO | WO 00/12186 | 3/2000 |
| WO | WO 00/32286 | 6/2000 |

OTHER PUBLICATIONS

Party Time—Psycho Cash Beast Brochure written by IGT, published in 1999.
Slots 2003 Brochure written by Strictly Slots, published Jan. 2003.
MegaJackpots Wheel of Fortune Brochure written by IGT, published in 1997.
Wheel of Fortune Advertisment written by IGT, published in 1998.
Wheel of Fortune Video Advertisement written by IGT, published in 1999.
Barn Yard Article in Strictly Slots, published in Mar. 2002.
Barn Yard Advertisement written by Aristocrat, available prior to Jun. 9, 2003.
Gold Fever Advertisement written by Atronic Casino Technology, Ltd., published 1999.
Gold Fever Atronic Web Page written by Atronic Casino Technology, Ltd., dated Mar. 2002.
Jewel in the Crown Advertisements written by Barcrest Ltd., published 1999.
Marshall Fey, Slot Machines a pictorial History of the First 100 Years, 1983, Liberty Belle Books, pp. 79, 150, 171, 231.
Easy Street Advertisements and Articles written by Casino Data Systems, published in 2000.
Austin Powers in Goldmember™ Advertisement written by IGT, published in 2003.
Description of Let's Make a Deal Television Show written by letsmakeadeal.com (2 pages), printed on Mar. 16, 2001.
Jewel in the Crown Advertisement written by IGT, published in 1999.

Let's Make a Deal Game Advertisement written by Bally Gaming Systems, not dated.
Let's Make a Deal geocities.com (2 pages), printed on Mar. 16, 2001.
Let's Make a Deal written by fortunecity.com (4 pages), printed on Mar. 21, 2001.
Let's Make a Deal written by geocities.com (10 pages), printed on Mar. 21, 2001.
Let's Make a Deal written by Illinoislottery.com (1 page), printed on Mar. 21, 2001.
Take Your Pick Article and Brochure, written by Strictly Slots, IGT/Anchor Games, published in 1999.
The Deals of Let's Make a Deal written by fortunecity.com (2 pages), printed on Jul. 20, 2004.
The Official Let's Make a Deal Website written by Bally Gaming Sytem Website, printed on Mar. 16, 2001.
Top Dollar Brochure, written by IGT, published in 1998.

* cited by examiner

GAMING DEVICE INCLUDING MOVABLE SYMBOL INDICATOR PLATES

CROSS REFERENCE TO RELATED APPLICATIONS

This application relates to the following co-pending, commonly owned applications: "GAMING DEVICE INCLUDING MOVABLE SYMBOL INDICATOR PLATES," Ser. No. 10/458,444, "GAMING DEVICE HAVING A DISPLAY DEVICE HAVING MULTIPLE ROTATABLE MEMBERS," Ser. No. 11/470,167, "GAMING SYSTEM SYMBOL DISPLAY," Serial No. 29/248,895.

BACKGROUND OF THE INVENTION

Gaming device manufacturers strive to make gaming devices that provide as much enjoyment and excitement as possible. Providing a secondary or bonus game in which a player has an opportunity to win potentially large awards or credits in addition to the awards associated with the primary or base game of the gaming device is one way to enhance player enjoyment and excitement.

Gaming devices having bonus games generally employ a triggering event that occurs during the base game operation of the gaming device. The triggering event temporarily stalls or halts the base game play and enables a player to enter a second, different game, which is the bonus game. The player plays the bonus game, likely receives an award, and returns to the base game.

One known gaming device is the "WHEEL OF FORTUNE" gaming device manufactured by the assignee of this application. In this game, a multi-colored award wheel is attached to a gaming device. The award wheel is divided into several sections. Each section includes an award that ranges in value from twenty to one thousand. In this game, a player plays a base game that includes spinning reels and a central payline. When the wheel symbol is positioned along the central payline on the third reel, the player enters the bonus game.

In the bonus game, the player obtains one opportunity or spin of the award wheel. The player spins the award wheel by pressing a button on the gaming device. Once the award wheel starts spinning, the player waits until it stops. An indicator located at the top of the award wheel points to a section of the wheel. The player receives the award on that section for the bonus game. After the player receives that award, the bonus game ends and the player can resume playing the base game.

Another known bonus game is described in U.S. Pat. No. 6,059,658. This patent discloses a spinning award wheel bonus game. The bonus game includes a display having five concentrically arranged wheels. Each wheel has indicia designated with an Ace, King, Queen, Jack, Ten and a wild symbol along the outer edge of the circles. Once a player enters the bonus game, the player initiates the spinning of the wheels. Each wheel rotates independently of the other wheels. The object of the bonus game is to align winning combinations of indicia, which in this game are winning hands in poker. An indicator points to a sequence of five indicia formed from each of the five rotating wheels. If the sequence equals a winning combination, the player receives an award. The award from the bonus game can be an additional award or multiplied by the award from the primary game.

Another bonus game is disclosed in U.S. Pat. No. 6,089,978. This patent discloses a bonus game which is triggered when a player obtains a winning combination of symbols on a plurality of reels. The bonus game is initiated and includes an award wheel with different bowling awards such as a spare and strike, indicated on the wheel. The gaming device provides the player with ten frames in the bonus game. The player presses a "Roll the Ball" button to initiate the spinning of the wheel. Once the wheel stops spinning, the player receives the score indicated on the wheel for a particular frame. The player spins the award wheel to obtain a score for each frame until all of the frames are completed. After the tenth and final frame is completed, the player's scores from all of the frames are totaled and provided to the player as a bonus award for the bonus game.

To increase player enjoyment and excitement, therefore, it is desirable to provide new bonus games having award wheels that provide larger awards to players with minimal risk.

SUMMARY OF THE INVENTION

One embodiment of the present invention provides a gaming device including two movable symbol indicator plates. The first symbol indicator plate or first plate includes a plurality of symbols. The symbols may be numbers, letters, characters or any suitable images, representations or symbols. In one embodiment, a plurality of awards are associated with the symbols. A second symbol indicator plate or second plate is positioned adjacent to the first plate and overlaps at least a portion of the first plate. The second plate includes a plurality of symbols indicators such as sections. It should be appreciated that the second plate may include one or more indicators or sections.

In one embodiment, the sections on the second plate are selectable by a player. The player selects at least one of the sections on the second plate. The second plate moves relative to the first plate to indicate one of the symbols on the first plate in the selected section. The gaming device provides the award to the player, which is associated with the symbol indicated by the selected selection on the second plate. It should be appreciated that the first plate may move relative to the second plate, the second plate may move relative to the first plate, or both plates may move (at the same or different rates) relative to each other. Additionally, the first plate and second plate may move simultaneously or alternately in a game.

In one embodiment, the second plate includes a substantially transparent material which enables a player to see through at least a portion of the second plate to view the symbols on the first plate. In this embodiment, each of the sections includes a substantially transparent material having a different color. The player picks one of the colored sections on the second plate. The gaming device moves the second plate relative to the first plate to indicate one of the symbols on the first plate in the colored section of the second plate, which was selected by the player. When the second plate stops moving, the colored section on the second plate selected by the player indicates one of the symbols on the first plate. The gaming device provides the award associated with the indicated symbol on the first plate to the player. It should be appreciated that the colors may be any suitable colors and the sections on the second plate may include at least two different colors, a plurality of different colors or all of the sections may include different colors.

In a further embodiment, two or more sections on the second plate include the same colors. In this embodiment, the player picks one of the colored sections on the second plate. The gaming device indicates or highlights all of the sections on the second plate that include the same color as the picked section. The second plate moves relative to the first plate to indicate one or more of the symbols on the first plate in the indicated or highlighted sections of the second plate. The gaming device provides the awards to the player, which are associated with any symbols indicated by the highlighted sections on the second plate. Therefore, the player has a greater opportunity to obtain more awards and larger awards in the game. It should be appreciated that one or more colors or one or more sections on the second plate may be selected by a player to indicate symbols on the first plate in a game.

In another embodiment of the present invention, the first plate includes scrambled symbols or symbol codes which represent one or more symbols in a game. The second plate includes a substantially transparent or see-through material which reveals or unscrambles the symbols or codes on the first plate when designated portions of the first and second plates overlap each other. In a game, the second plate moves relative to the first plate to indicate one of the scrambled symbols or codes on the first plate. The player picks one of the selections on the second plate. The gaming device activates or spins the second plate. The scrambled symbol or symbol code indicated by the selected section on the second plate is revealed or unscrambled so that the indicated symbol is now viewable by the player. The gaming device provides any awards associated with the indicated unscrambled symbol to the player in the game.

In another embodiment, both the first and second plates include scrambled symbols or symbol codes. The player picks one of the sections on the second plate. The gaming device activates or spins the second plate and displays one of the symbols in the selected section of the second plate based on the overlapping codes from the first and second plates. The gaming device provides any awards associated with the symbol associated with the section on the second plate picked by the player. It should be appreciated that the scrambled symbols or codes included on the first and/or second plates may be any suitable scrambled symbols or codes desired by the game implementor.

In one embodiment, the first and second plates are mechanical wheels that are attached to a cabinet of the gaming device. In this embodiment, the first plate may rotate relative to the second plate, the second plate may rotate relative to the first plate, or both the first and second plates may move simultaneously or alternatively as desired by the game implementor. In a further embodiment, the first and second plates are video wheels displayed by the display device. It should be appreciated that the first and/or the second plate may be a mechanical and/or a video wheel in a game. For example, the first plate may be a video wheel and the second plate may be a mechanical wheel or the first plate may be a mechanical wheel and the second plate may be a video wheel.

In another embodiment, the first and second symbol indicator plates include transparent liquid crystal displays (LCDs). The transparent LCDs include low-power flat-panel displays made up of a liquid crystal sandwiched between layers of a suitable material such as glass or plastic, which become opaque when electric current passes through the layers. The contrast between the opaque and transparent areas forms visible symbols, numbers, letters or other suitable images on one or both of the symbol indicator plates. In one embodiment, at least one portion of the first symbol indicator plate overlaps the second symbol indicator plate to indicate symbols displayed on the second symbol indicator plate. In another embodiment, at least one portion of the second symbol indicator plate overlaps the first symbol indicator plate to indicate symbols on the first symbol indicator plate.

In a further embodiment of the present invention, the gaming device includes two symbol indicator plates, where a first symbol indicator plate or first plate includes a plurality of symbols, which represent awards provided to the player by the gaming device, and a second symbol indicator plate or second plate includes a transparent section. The remaining portion or sections of the second symbol indicator plate is opaque or substantially non-transparent such that only the symbols indicated by the transparent section are visible by a player. In one embodiment, the second plate rotates in a counter clockwise direction, while the first plate remains stationary. It should be appreciated that the first plate may remain stationary while the second plate rotates, the second plate may remain stationary while the first plate rotates or both the first and second plates may rotate in the same or different directions and at the same or different rates. After the second plate stops spinning, the transparent section of the second plate indicates one or more symbols on the first plate. The gaming device then randomly selects one of the indicated symbols in the transparent section and provides an award associated with the selected indicated symbol to the player. In another embodiment, the gaming device provides the awards associated with all of the indicated symbols in the transparent section to the player. In one aspect of this embodiment, the gaming device sums the awards associated with the indicated symbols and provides the summed award to the player. In another aspect, the gaming device multiplies the awards associated with the indicated symbols and provides the multiplied award to the player.

In a further embodiment, the second plate includes a plurality of transparent sections which indicate one or more symbols on the first plate. Additionally, a plurality of awards are associated with the symbols. In this embodiment, the second plate rotates or spins, while the first plate remains stationary. When the second plate stops rotating or spinning, the transparent sections on the second plate indicate one or more symbols on the first plate. The gaming device then randomly selects one of the symbols indicated in the transparent sections and provides the award associated with the selected indicated symbol. It should be appreciated that one, a plurality or all of the awards associated with the symbols indicated in the transparent sections may be provided to the player. In one embodiment, the awards associated with the indicated symbols in the transparent sections are summed and provided to the player. In another embodiment, the awards associated with the indicated symbols in the transparent sections are multiplied and provided to the player.

In another embodiment, the gaming device randomly selects and provides one of the awards associated with the symbols indicated in an activated transparent section or sections on one of the symbol indicator plates in one or more spins in a game. In this embodiment, the gaming device may randomly determine, pre-determine or determine based on a wager made by a player, the transparent section or sections which are activated in a spin or spins in a game. In another embodiment, a player picks the transparent section or sections that are activated in a spin or spins in the game. In a further embodiment, the gaming device provides the awards to the player associated with a plurality of the symbols indicated in the activated transparent section or sections in a spin or spins. In another embodiment, the gaming device provides the awards associated with all of the symbols indicated in the activated transparent section or sections to the player. In one aspect of this embodiment, the awards are summed by the gaming device and provided to the player. In another aspect, the awards are multiplied and provided to the player.

In a further embodiment, the symbols on the first plate are positioned such that one or more areas or quadrants of the first plate include more symbols than other areas or quadrants on the first plate. In this embodiment, the transparent section or sections on the second plate indicate more symbols on the first plate in the specific areas of the first plate that include more symbols than the areas that include less symbols. Therefore, the gaming device provides more awards to the player when the transparent section or sections of the second plate indicate areas or quadrants having more symbols.

It is therefore an advantage of the present invention to provide a gaming device including overlapping plates which indicate one or more symbols to a player.

Another advantage of the present invention is to provide a gaming device that enables a player to interact with a game.

Other objects, features and advantages of the invention will be apparent from the following detailed disclosure, taken in conjunction with the accompanying sheets of drawings, wherein like numerals refer to like parts, elements, components, steps and processes.

DETAILED DESCRIPTION OF THE INVENTION

Gaming Device and Electronics

Figure 1A:
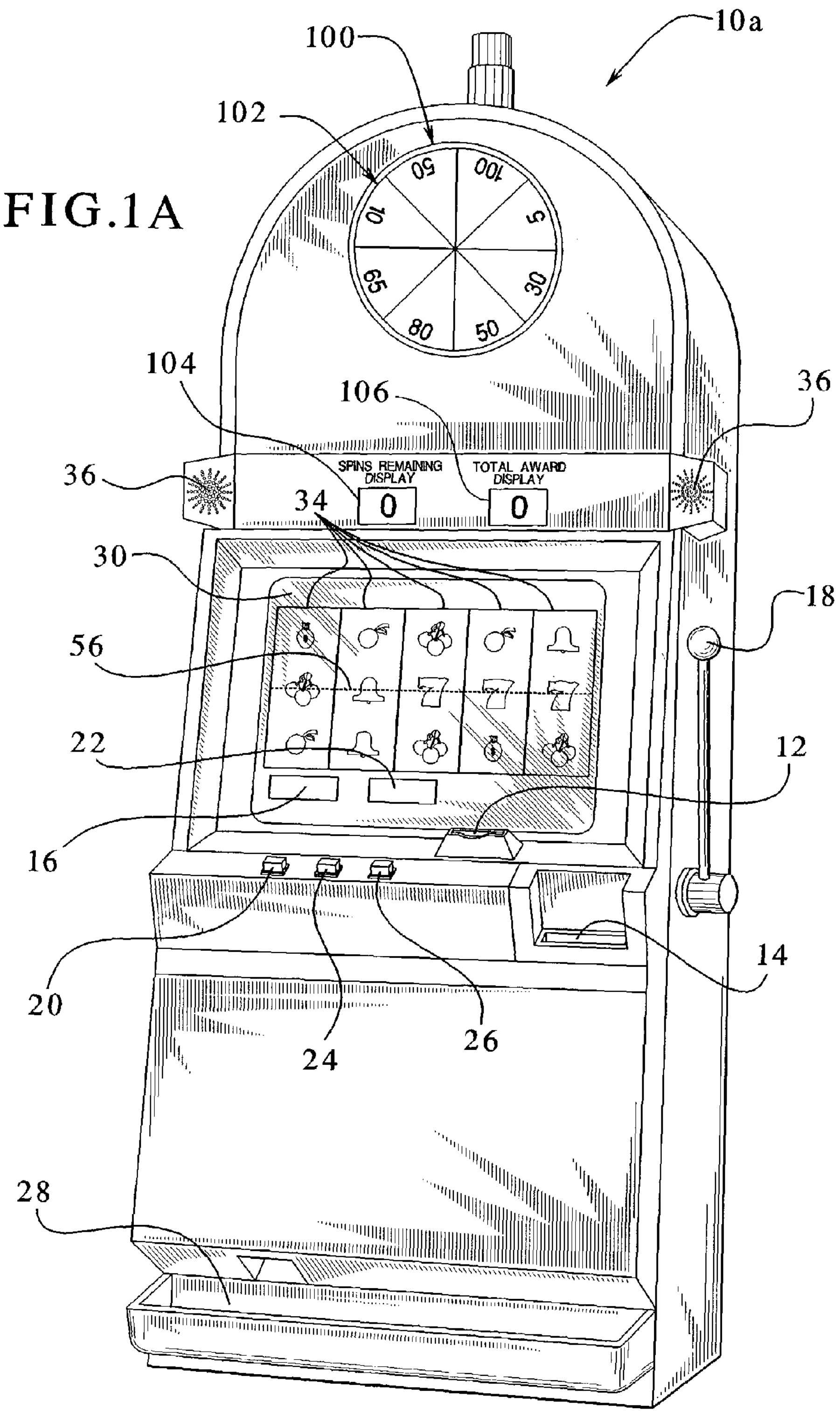
FIG. 1A is a front perspective view of one embodiment of the gaming device of the present invention.
Figure 1B:
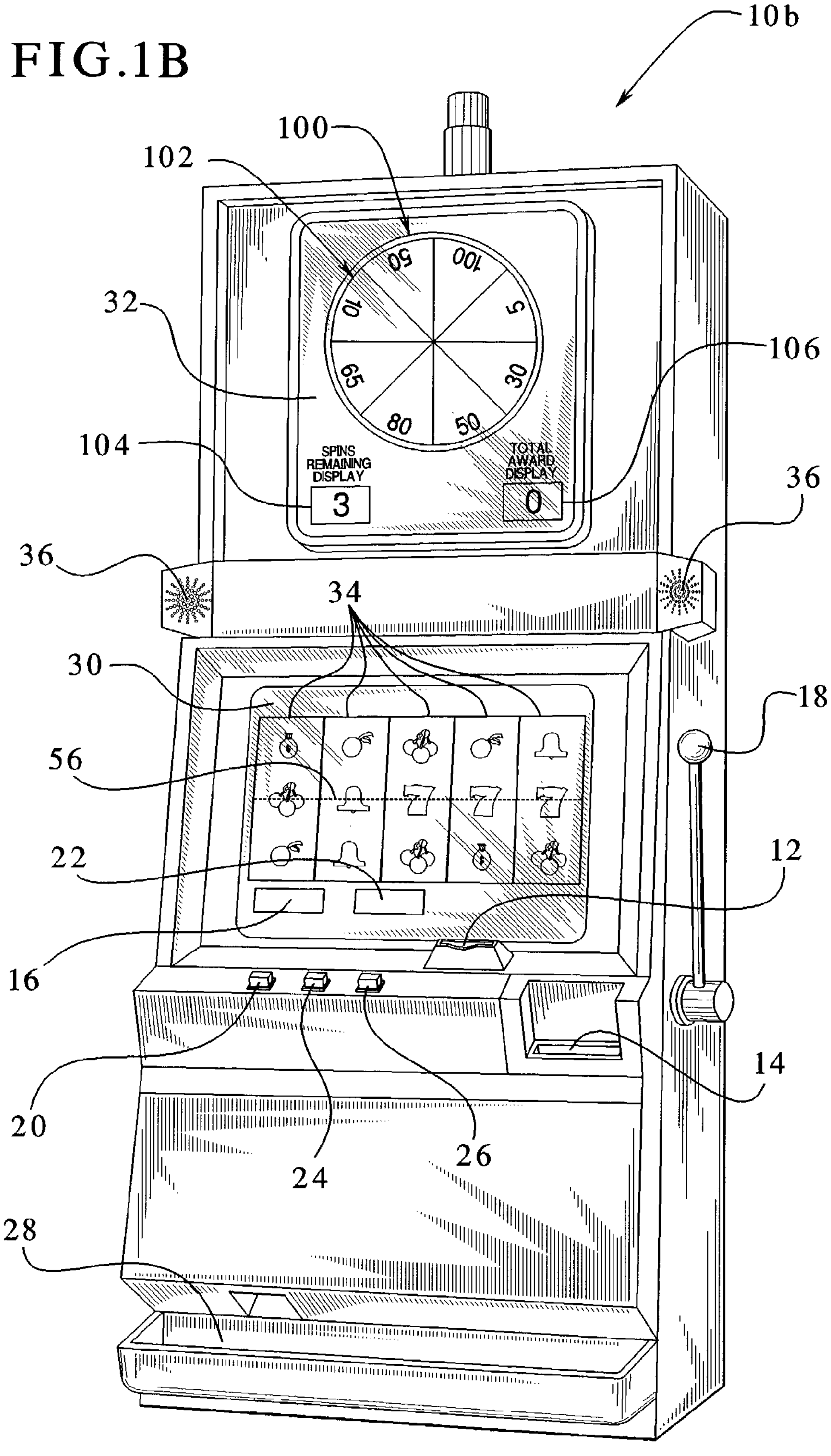
FIG. 1B is a front perspective view of another embodiment of the gaming device of the present invention.

Referring now to the drawings, two embodiments of the gaming device of the present invention are illustrated in FIGS. 1A and 1B as gaming device 10*a* and gaming device 10*b*, respectively. Gaming device 10*a* and/or gaming device 10*b* are generally referred to herein as gaming device 10. Gaming device 10 in one embodiment has the controls, displays and features of a conventional slot machine. It is constructed so that a player can operate it while standing or sitting, and gaming device 10 is preferably mounted in a cabinet. However, it should be appreciated that gaming device 10 can be constructed as a pub-style table-top game (not shown) which a player can operate preferably while sitting. Furthermore, gaming device 10 can be constructed with varying cabinet and display designs, as illustrated by the designs shown in FIGS. 1A and 1B.

Gaming device 10 can incorporate any primary game such as slot, poker, blackjack or keno, and any of the bonus triggering events and bonus games associated with these primary games. The symbols and indicia used on and in gaming device 10 may be in mechanical, electrical, electronic or video form.

As illustrated in FIGS. 1A and 1B, gaming device 10 includes a coin slot 12 and bill acceptor 14 where the player inserts money, coins or tokens. The player can place coins in the coin slot 12 or paper money or ticket vouchers in the bill acceptor 14. Other devices could be used for accepting payment such as readers or validators for credit cards or debit cards. When a player inserts money in gaming device 10, a number of credits corresponding to the amount deposited is shown in a credit display 16. After depositing the appropriate amount of money, a player can begin the game by pulling arm 18 or pushing play button 20. Play button 20 can be any play activator used by the player which starts any game or sequence of events in the gaming device.

As shown in FIGS. 1A and 1B, gaming device 10 also includes a bet display 22 and a bet one button 24. The player places a bet by pushing the bet one button 24. The player can increase the bet by one credit each time the player pushes the bet one button 24. When the player pushes the bet one button 24, the number of credits shown in the credit display 16 decreases by one, and the number of credits shown in the bet display 22 increases by one. Other bet or wager indicators such as a bet max button may also be employed in the gaming device of present invention.

A player may cash out and thereby receive a number of coins corresponding to the number of remaining credits by pushing a cash out button 26. When the player cashes out, the player receives the coins in a coin payout tray 28. The gaming device 10 may employ other payout mechanisms such as credit slips redeemable by a cashier or electronically recordable cards which keep track of the player's credits.

Gaming device 10 also includes one or more display devices. The embodiment shown in FIG. 1A includes a central display device 30, an upper display device 32, and the alternative embodiment shown in FIG. 1B includes a central display device 30 as well as an upper display device 32. Gaming device 10 in one embodiment displays a plurality of reels 34 such as three to five reels 34 in mechanical or video form at one or more of the display devices. A display device can be any viewing surface such as glass, a video monitor or screen, a liquid crystal display or any other display mechanism. If the reels 34 are in video form, the display device for the video reels 34 is preferably a video monitor. Each reel 34 displays a plurality of indicia such as bells, hearts, fruits, numbers, letters, bars or other images which preferably correspond to a theme associated with the gaming device 10. Furthermore, gaming device 10 preferably includes speakers 36 for producing sounds such as music.

Figure 2:
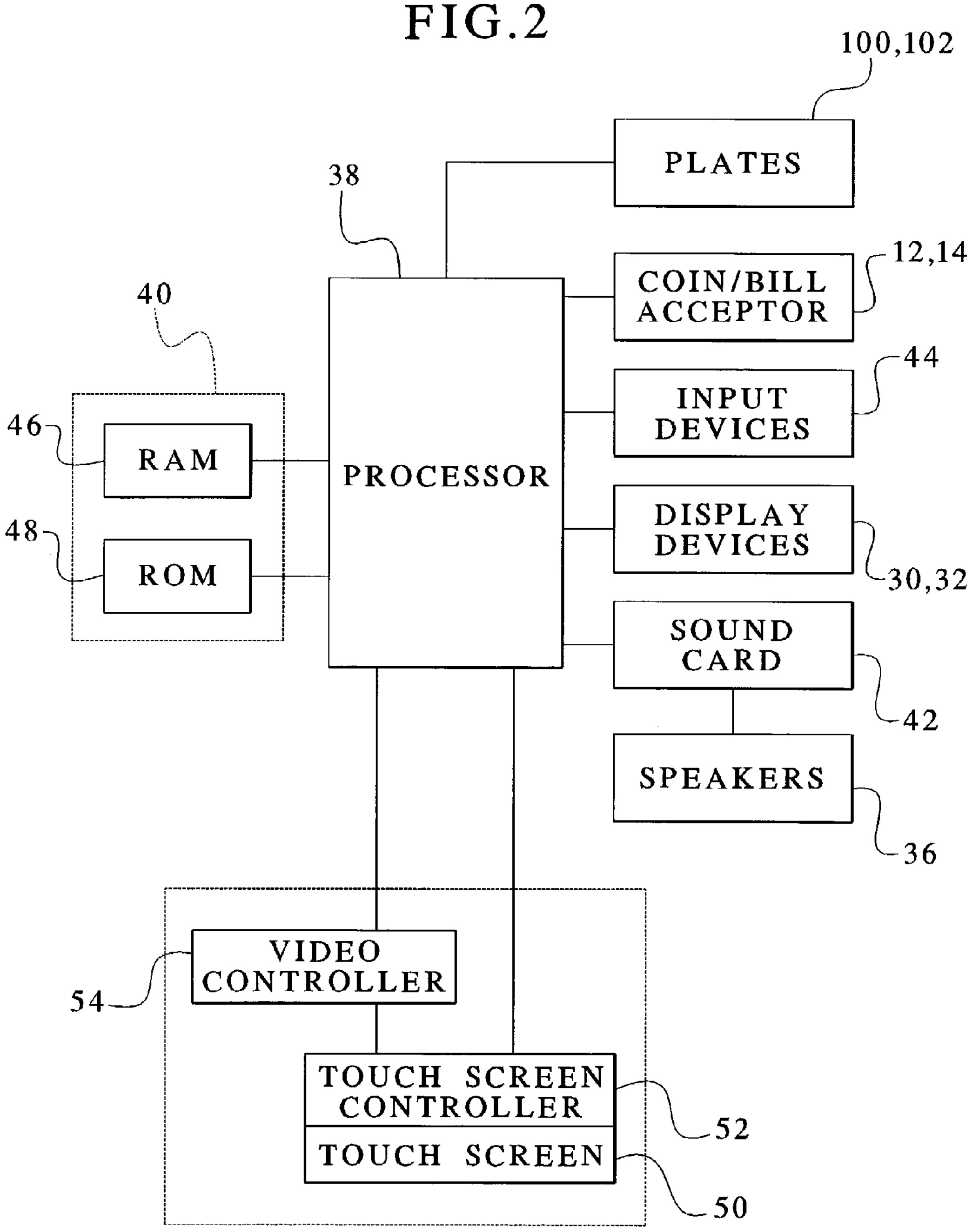
FIG. 2 is a schematic black diagram of the electronic configuration of one embodiment of the gaming device of the present invention.

As illustrated in FIG. 2, the general electronic configuration of gaming device 10 preferably includes: a processor 38; a memory device 40 for storing program code or other data; a central display device 30; an upper display device 32; symbol indicator plates or plates 100 and 102; a sound card 42; a plurality of speakers 36; and one or more input devices 44. The processor 38 is preferably a microprocessor or microcontroller-based platform which is capable of displaying images, symbols and other indicia such as images of people, characters, places, things and faces of cards. One or more secondary processors may also be employed in conjunction with the primary processor to control certain aspects of the game function. The memory device 40 can include random access memory (RAM) 46 for storing event data or other data generated or used during a particular game. The memory device 40 can also include read only memory (ROM) 48 for storing program code which controls the gaming device 10 so that it plays a particular game in accordance with applicable game rules and pay tables.

As illustrated in FIG. 2, the player preferably uses the input devices 44, such as pull arm 18, play button 20, the bet one button 24 and the cash out button 26 to input signals into gaming device 10. In certain instances it is preferable to use a touch screen 50 and an associated touch screen controller 52 instead of a conventional video monitor display device. Touch screen 50 and touch screen controller 52 are connected to a video controller 54 and processor 38. A player can make decisions and input signals into the gaming device 10 by touching touch screen 50 at the appropriate places. As further illustrated in FIG. 2, the processor 38 can be connected to coin slot 12 or bill acceptor 14. The processor 38 can be programmed to require a player to deposit a certain amount of money in order to start the game.

It should be appreciated that although a processor 38 and memory device 40 are preferable implementations of the present invention, the present invention can also be implemented using one or more application-specific integrated circuits (ASIC's) or other hard-wired devices, or using mechanical devices (collectively or alternatively referred to herein as a "processor"). Furthermore, although the processor 38 and memory device 40 preferably reside on each gaming device 10 unit, it is possible to provide some or all of their functions at a central location such as a network server for communication to a playing station such as over a local area network (LAN), wide area network (WAN), Internet connection, microwave link, and the like. The processor 38 and memory device 40 are generally referred to herein as the "computer" or "controller."

With reference to FIGS. 1A, 1B and 2, to operate the gaming device 10, in one embodiment the player must insert the appropriate amount of money or tokens at coin slot 12 or bill acceptor 14 and then pull the arm 18 or push the play button 20. The reels 34 will then begin to spin. Eventually, the reels 34 will come to a stop. As long as the player has credits remaining, the player can spin the reels 34 again. Depending upon where the reels 34 stop, the player may or may not win additional credits.

In addition to winning credits in this manner, in one embodiment gaming device 10 also gives players the opportunity to win credits in a bonus round. This type of gaming device 10 will include a program which will automatically begins a bonus round when the player has achieved a qualifying condition in the game. This qualifying condition can be a particular arrangement of indicia on a display device. The gaming device 10 may use mechanical devices or a video-based central display device 30 to enable the player to play the bonus round. In one embodiment, the qualifying condition is a predetermined combination of indicia appearing on a plurality of reels 34. As illustrated in the five reel slot game shown in FIGS. 1A and 1B, the qualifying condition could be the number seven appearing on three adjacent reels 34 along a payline 56. It should be appreciated that the present invention can include one or more paylines, such as payline 56, wherein the paylines can be horizontal, diagonal or any combination thereof.

Symbol Indicator Plates

Figure 3A:
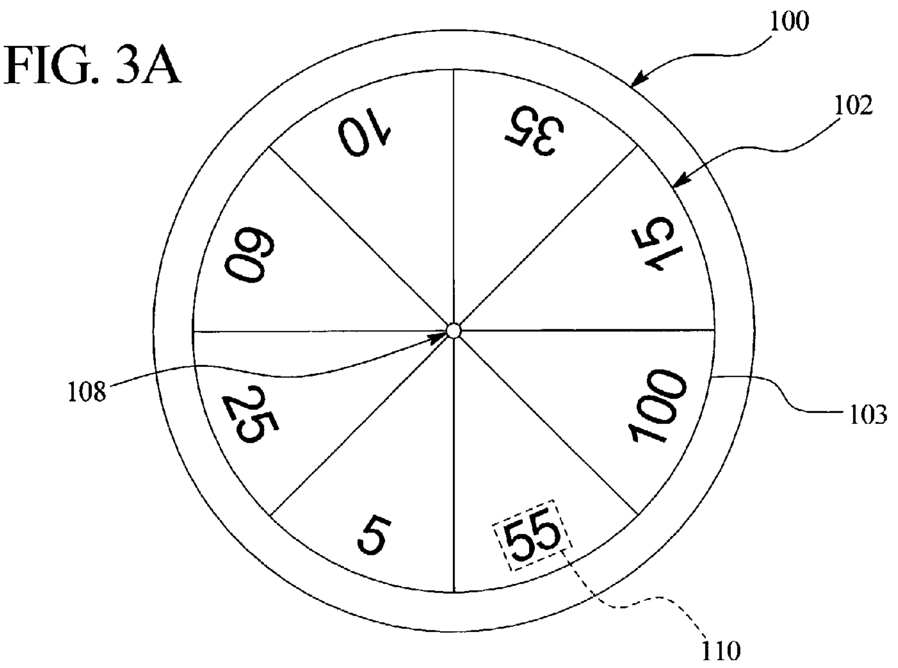
FIG. 3A is an enlarged elevation view of two symbol indicator plates of the present invention.

Referring to FIGS. 1A, 1B and 3A, one embodiment of the present invention includes a gaming device having two movable symbol indicator plates, which indicate one or more symbols in a game. The symbol indicator plates 100 and 102 are adjacent plates configured to at least partially overlap each other. The first symbol indicator plate or first plate 100 includes one or more symbols. The symbols may be game elements, award symbols, values, credits or any other suitable symbol or symbols. In FIG. 3A, in one embodiment, the symbols 110 are values. The first symbol indicator plate or first plate may be round, square, or any suitable shape as desired by the game manufacturer. The second symbol indicator plate 102 or second plate overlaps at least a portion of the first plate 100 and preferably completely overlaps the first plate 100. The second plate 102 is manufactured with a substantially transparent material which enables a player to see through at least a portion of the second plate to view one or more of the symbols on the first plate. In one embodiment, the second plate 102 includes sections 103 which indicate one or more symbols on the first plate 100. In one embodiment, the sections 103 on the second plate 102 include a substantially transparent material having different colors. In another embodiment, the second plate 102 includes sections 103 where at least one of the sections includes a different color than the other sections on the plate. In one embodiment, the gaming device provides awards associated with any symbols indicated by a designated color on the second plate. The designated color may be pre-determined or randomly determined. In another embodiment, the gaming device includes an input which enables a player to pick the designated color or colors.

Figure 3B:
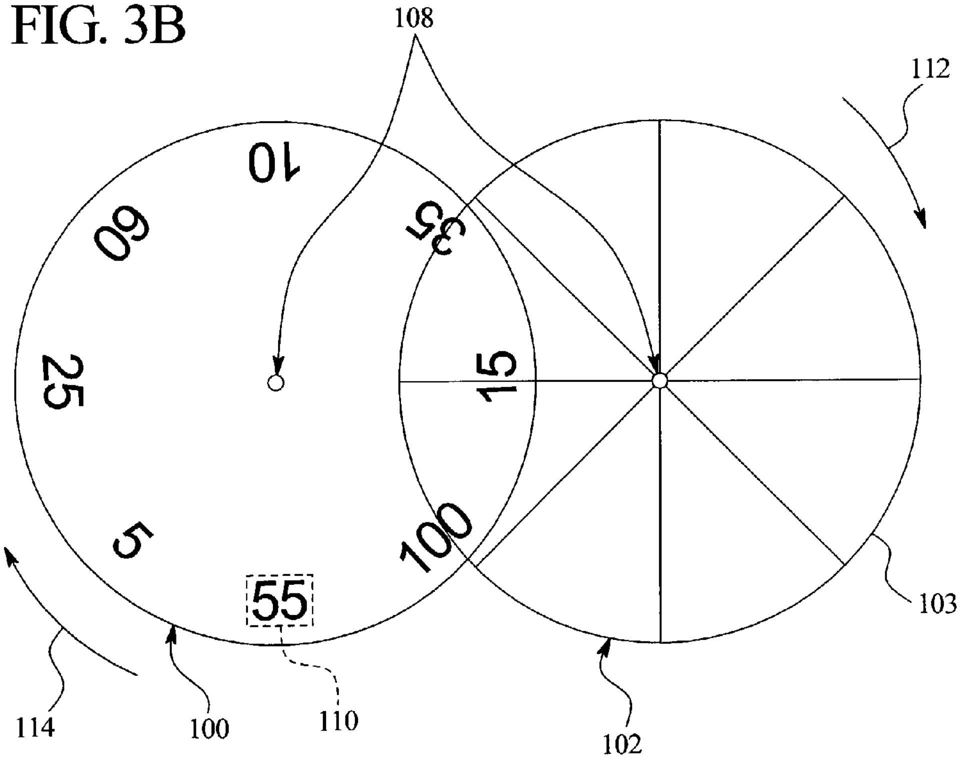
FIG. 3B is an enlarged elevation view of the symbols indicator plates of the present invention where one plate partially overlaps the other plate.

Referring to FIG. 3B, in one embodiment, the second symbol indicator plate or second plate 102 overlaps at least a portion of the first plate 100 and preferably completely overlaps the first plate. In another embodiment, the second plate 102 partially overlaps the first plate 100 as shown in FIG. 3B. In this embodiment, the gaming device provides any awards associated with the symbol or symbols indicated by the sections 103 which overlap the first plate 100.

In one embodiment, the first and second plates 100 and 102 are mounted to the gaming device on a common axis 108, as shown in FIGS. 3A and 3B. In this embodiment, the symbol indicator plates are wheels which rotate about the axis 108. The second plate 102 overlaps the first plate. In one embodiment, the second plate 102 rotates in a clockwise direction as shown by the arrow 112, while the first plate 100 remains stationary. In another embodiment, the first plate 100 rotates in a clockwise direction about the axis 108 as indicated by the arrow 114, while the second plate remains stationary. In a further embodiment, the first and second plates 100 and 102 both rotate in a clockwise direction about the common axis 108. It should be appreciated that the first and/or second plates may rotate in a clockwise direction, a counterclockwise direction, or any combination of clockwise and counterclockwise directions. Furthermore, the first and second symbol indicator plates 100 and 102 may rotate simultaneously or alternately in a game.

Figure 4A:
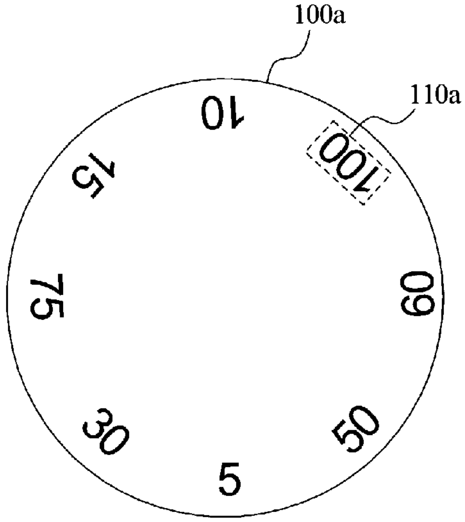
FIG. 4A is an enlarged elevation view of one embodiment of a first symbol indicator plate of the present invention.
Figure 4B:
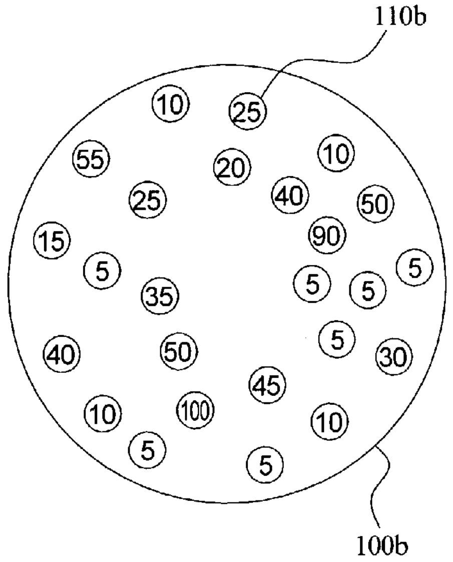
FIG. 4B is an enlarged elevation view of another embodiment of the symbol indicator plate of FIG. 4*a*.

Referring to FIGS. 4A and 4B, two embodiments of the first plate 100 are illustrated where the first plate includes one or more symbols. In FIG. 4A, one embodiment of the first plate is illustrated where the first symbol indicator plate 100*a* includes a plurality of symbols, which are values or credits. The symbols 110*a* are positioned on the first plate 100*a* so that the symbols appear in one or more of the sections on the second plate. It should be appreciated that the symbols may be game elements, values, credits, multipliers, or any suitable symbols in a game. Additionally, the first plate 100*a* is shown as a wheel in this embodiment. However, it should be appreciated that the first symbol indicator plate may be configured in any suitable shape as desired by the game manufacturer.

Referring to FIG. 4B, another embodiment of the first plate is illustrated where the first plate 100*b* includes a plurality of randomly positioned symbols. In this embodiment, the symbols represent award symbols displaying values or credits to a player. The values or credits associated with the symbols 110*b* may be any suitable values or credits as desired by the game manufacturer. The gaming device provides the player with the values associated with the symbols indicated by one or more sections of the second plate. It should be appreciated that the first plate 100 may include one or more symbols having one or more award associated with those symbols.

Figure 5A:
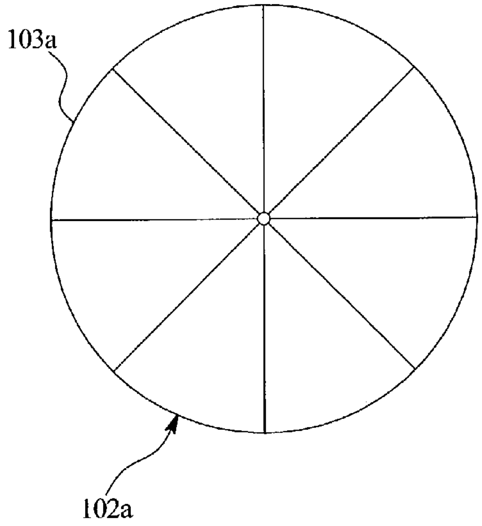
FIG. 5A is an enlarged elevation view of one embodiment of a second symbol indicator plate of the present invention.
Figure 5B:
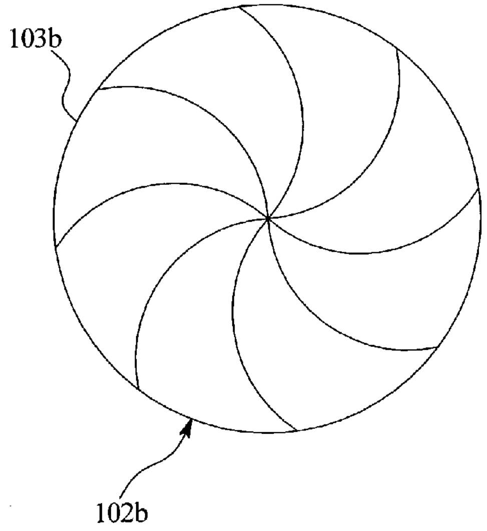
FIG. 5B is an enlarged elevation view of another embodiment of the symbol indicator plate of FIG. 5*a*.

Referring to FIGS. 5A and 5B, two embodiments of the second symbol indicator plate or second plate 102 of the present invention are illustrated. In FIG. 5A, the second plate is a wheel 102*a*, including a plurality of sections 103*a*. Each of the sections 103*a* indicates one or more symbols on the first symbol indicator plate 100 as described in FIGS. 4A and 4B. In FIG. 5B, another embodiment of the second symbol indicator plate 102*b* is illustrated where the sections 103*b* are configured with a curved shape. In this embodiment, the symbol or symbols indicated in the designated section or sections 103*b* on the plate 102*b* are the indicated symbols in the game.

Figure 6:
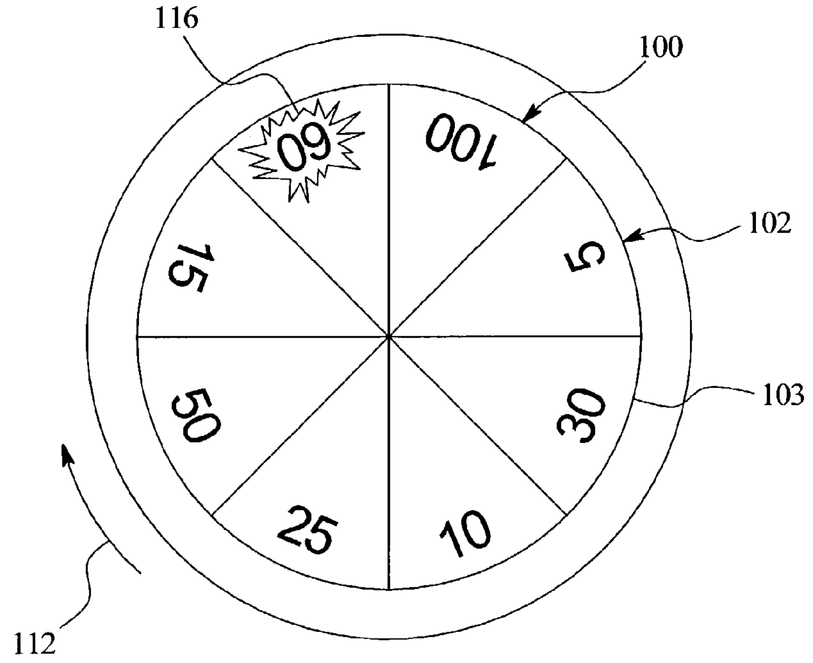
FIG. 6 is an enlarged elevation view of the symbol indicator plates of the present invention where the second symbol indicator plate indicates a symbol on the first symbol indicator plate.

Referring to FIG. 6, one embodiment of the present invention is illustrated where the first plate 100 remains stationary and includes a plurality of symbols, which include values or credits such as five, one hundred and sixty. The second plate 102 completely overlaps the first symbol indicator plate 100 and includes a plurality of sections 103 to indicate one or more of the symbols on the first plate 100. In this example, the first plate remains stationary while the second plate moves or rotates in a clockwise direction relative to the first plate. The gaming device enables a player to pick one of the sections 103 on the second plate 102. The player picks section 116 which indicates a symbol including an award or value of sixty as shown in FIG. 6. The gaming device provides the award of sixty to the player in the game.

Figure 7:
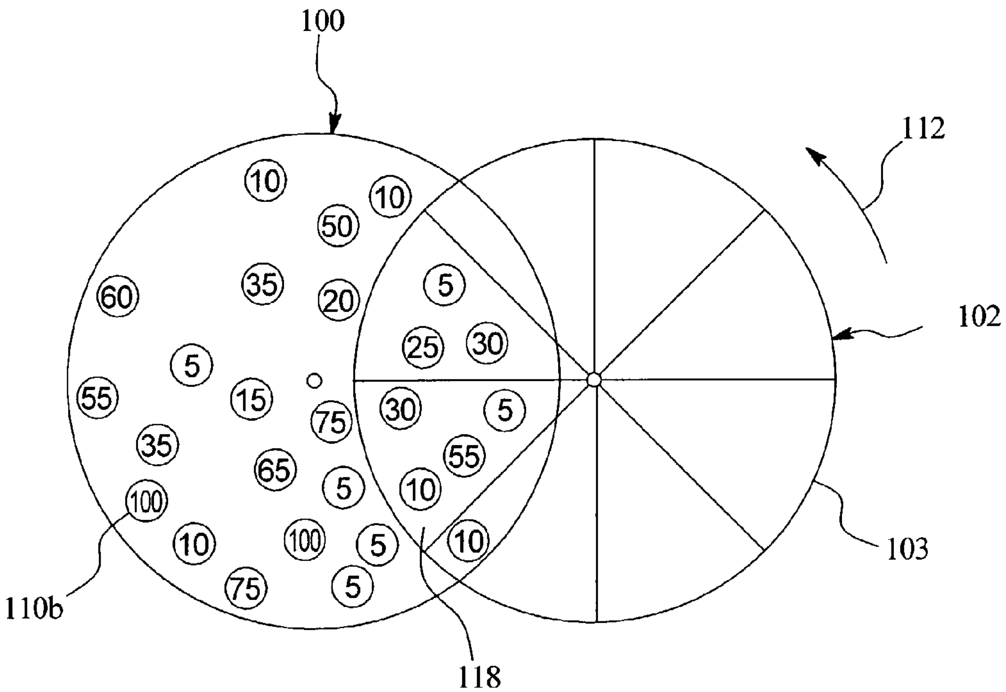
FIG. 7 is an enlarged elevation view of the symbol indicator plates of the present invention where the second plate indicates a plurality of symbols on the first plate.

Referring to FIG. 7, an example of one embodiment of the present invention is illustrated where the first plate includes a plurality of symbols having values as described by FIG. 4B. The values associated with each of the symbols 110*b* on the first plate 100 may be any suitable values and may be randomly determined, predetermined or determined using any suitable method. A second plate 102 partially overlaps a portion of the first plate 100 as shown in FIG. 7. The second plate rotates in a counterclockwise direction as shown by the arrow 112 while the first symbol indicator plate 100 remains stationary. The gaming device enables the player to pick one of the sections 103 on the second plate 102 to indicate one or more of the symbols on the first plate 100. In this example, the player picks section 118. The gaming device activates or spins the second plate 102 and the picked section, section 118, indicates four symbols on the first plate 100. The four symbols include awards or values of five, ten, thirty and fifty-five. Therefore, the total award associated with the symbols indicated by section 118 is one hundred. The award of one hundred is added to the player's total award in the game. In another embodiment, the gaming device activates the first symbol indicator plate 100, while the second symbol indicator plate 102 remains stationary. As described above, the gaming device provides the awards associated by the symbols indicated by the section on the stationary second symbol indicator plate 102 picked by the player. In a further embodiment, the gaming device activates or spins both symbol indicator plates 100 and 102 to indicate symbols in the section picked by the player. It should be appreciated that a player may pick one or more sections to indicate symbols in a game.

Figure 8:
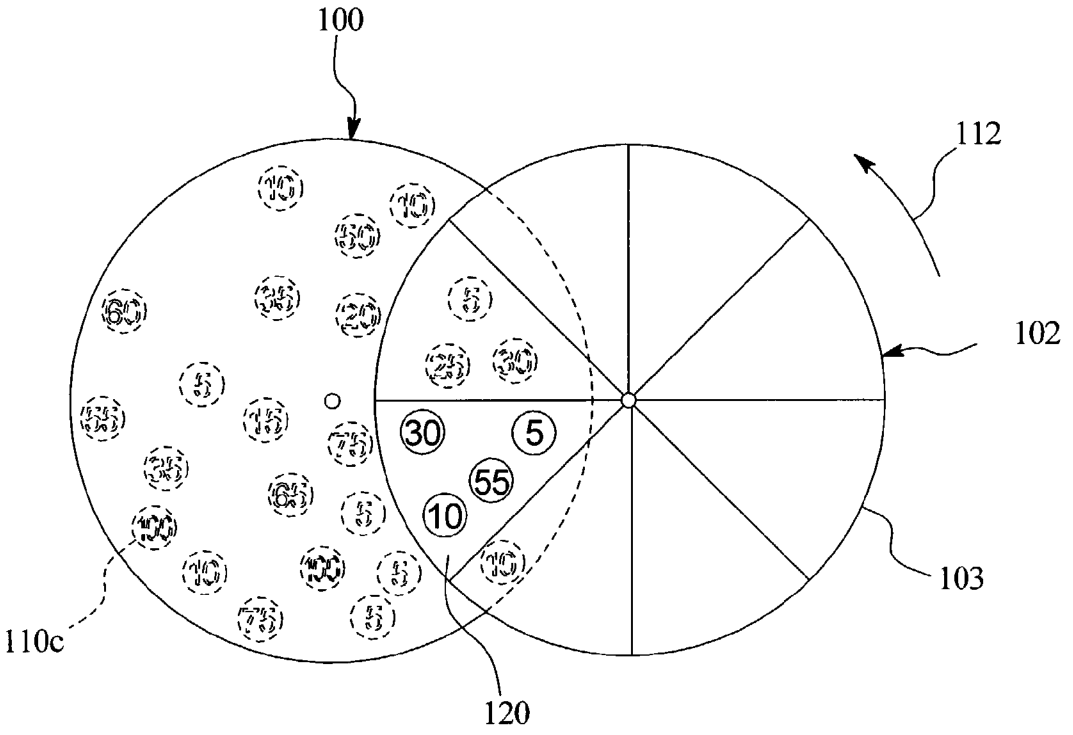
FIG. 8 is an enlarged elevation view of the symbol indicator plates of the present invention where the second plate unscrambles or decodes one or more scrambled or coded symbols on the first plate.

Referring to FIG. 8, another embodiment of the present invention is illustrated where the first plate 100 includes scrambled or coded symbols 110*c* (shown in phantom). In one aspect of this embodiment, the symbols 110*c* are digitally scrambled and printed on an opaque material. It should be appreciated that the symbols may be scrambled or coded according to any suitable scrambling or coding method. The second plate 102 is made of a substantially transparent film or material and overlaps at least a portion of the first plate as shown in FIG. 8. The second plate includes a plurality of sections 103, where each of the sections unscrambles or decodes one or more of the symbols on the first plate when the sections align with the scrambled or coded symbols on the first plate. In this embodiment, the sections on the first plate are pie-shaped. However, it should be appreciated that the sections may be any suitable configuration, pattern or shape.

In one embodiment, the gaming device enables a player to pick one of the sections 103 on the second plate 102. The gaming device activates or spins the second plate 102 and unscrambles or decodes the symbol or symbols 110*c*, which are indicated in the section picked by the player. In FIG. 8, the player picked section 120, which indicates four symbols. The symbols include awards or values of five, ten, thirty and fifty-five, which are provided to the player. As illustrated in FIG. 8, only the symbols indicated in the picked section 120 are decoded and viewable by the player. The other symbols, which are not indicated by the picked section, remain scrambled or coded and not viewable by the player. It should be appreciated that any suitable number of symbols may be indicated by one or more of the sections on the second plate, and then unscrambled and decoded in a game.

In a further embodiment, both the first plate 100 and the second plate 102 include scrambled or coded symbols or patterns. In this embodiment, one or more symbols are unscrambled or decoded and displayed to a player when one or more portions of the first and second plates align in a game. It should be appreciated that one or a plurality of symbols may be scrambled or coded on the first and/or the second plate in a game.

Figure 9A:
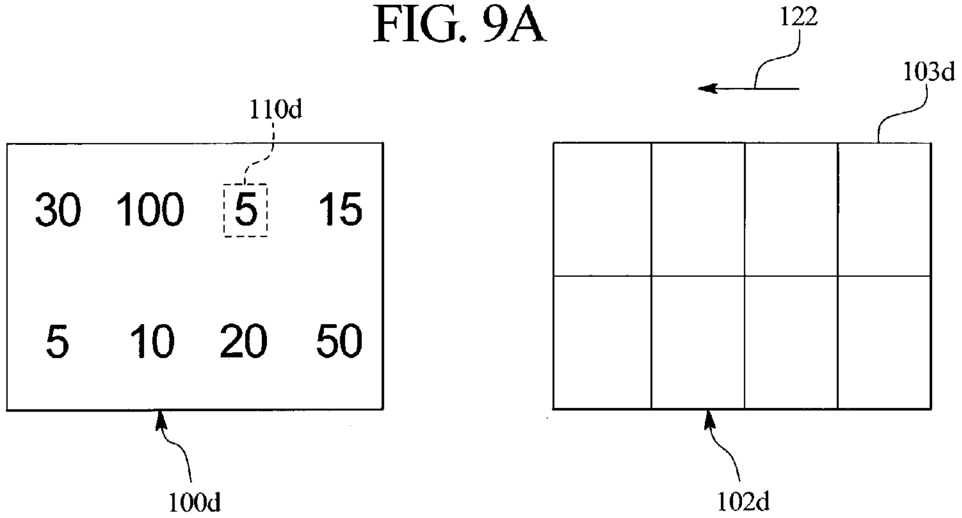
FIG. 9A is an enlarged elevation view of further embodiment of the symbol indicator plates of the present invention.

Referring to FIG. 9A, a further embodiment of the present invention is illustrated where the first and second plates are configured as rectangular plates 100*d* and 102*d*, where the second plate 102*d* overlaps at least a portion of the first plate 100*d*. The second plate 102*d* includes a plurality of sections 103*d*, which indicate one or more symbols 110*d* on the first plate 100*d*. In this embodiment, the second plate 102*d* moves horizontally over the first plate 100*d* as indicated by the arrow 122. It should be appreciated that the second plate 102*d* may be positioned on either side of the first plate 100*d* and may move in any direction desired by the game implementor. Furthermore, the first plate 100*d* may remain stationary while the second plate 102*d* moves relative to the first plate, the second plate 102*d* may remain stationary, while the first plate 100*d* moves relative to the second plate, or any combination therein. Additionally, the first and second plates may move simultaneously or alternately in a game.

Figure 9B:
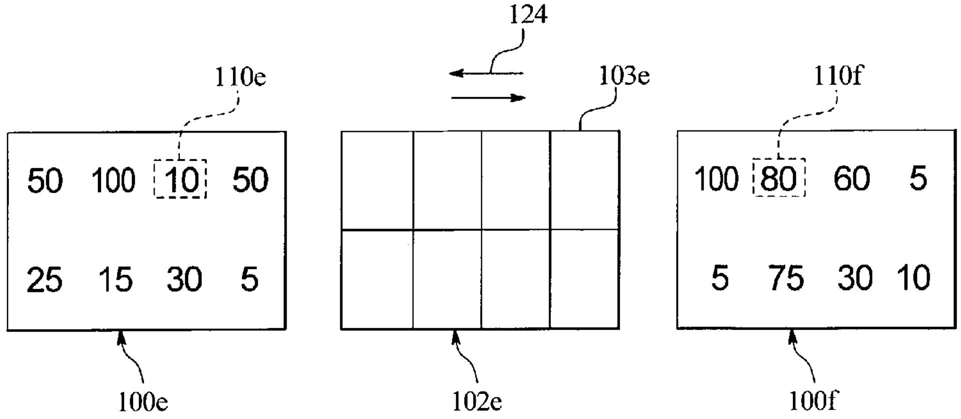
FIG. 9B is an enlarged elevation view of another embodiment of the symbol indicator plates of the present invention.

Referring to FIG. 9B, another embodiment of the present invention illustrated where the gaming device includes three symbol indicator plates or a first, second and third plate 100*e*, 102*e* and 100*f*, respectively. The plates 100*e* and 100*f* include a plurality of symbols 110*e* and 110*f*, where at least two of the symbols are different. In another embodiment, all of the symbols are different on the indicator plates 100*e* and 100*f*. In one embodiment, the symbol indicator plate 102*e* includes a plurality of sections 103*e*, which indicate one or more of the symbols 110*e* or 110*f* on the symbol indicator plates 100*e* and 100*f*, respectively. The symbol indicator plate 102*e* may move left or right as indicated by the arrows 124, or in any suitable direction as desired by the game implementor. In a game, the symbol indicator plate 102*e* moves left or right to indicate one or more of the symbols on the plates 100*e* and 100*f*. In one embodiment, a player picks one of the sections 103*e* on the symbol indicator plate 102*e*. The symbol indicator plate 102*e* then moves either left or right to indicate one of the symbols on the symbol indicator plate 100*e* or 100*f*.

In another embodiment, the first and second symbol indicator plates include transparent liquid crystal displays (LCDs). The transparent LCDs include low-power flat-panel displays made up of a liquid crystal sandwiched between layers of a suitable material such as glass or plastic, which become opaque when electric current passes through the layers. The contrast between the opaque and transparent areas forms visible symbols or characters on one or both of the symbol indicator plates. Therefore, any suitable symbols, numbers, letters and other suitable images may be displayed on one or both of the symbol indicator plates. In one embodiment, the second symbol indicator plate (second transparent LCD) includes sections or segments formed on the second LCD display where at least a portion of the second symbol indicator plate overlaps the first symbol indicator plate to indicate symbols displayed on the first symbol indicator plate or first transparent LCD. It should be appreciated that at least a portion of the first symbol indicator plate preferably overlaps the second symbol indicator plate to indicate symbols on the second symbol indicator plate.

Figure 10A:
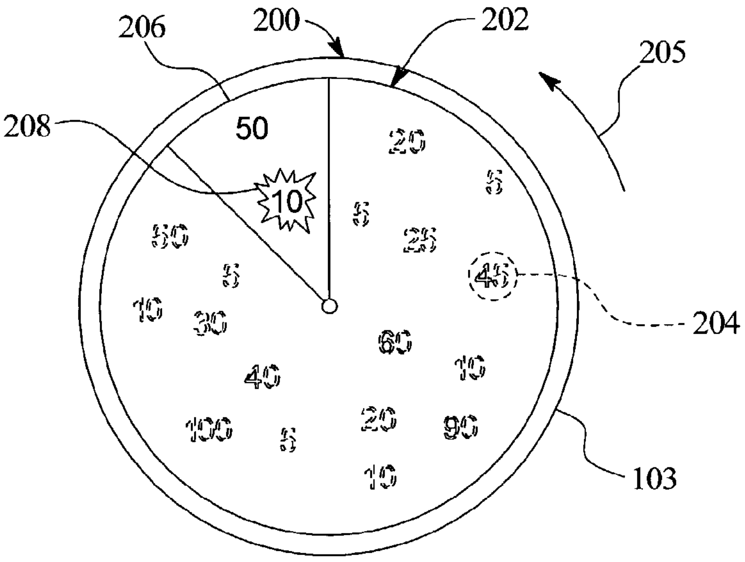
FIG. 10A is an enlarged elevation view of another embodiment of the symbol indicator plates of the present invention where the second symbol indicator plate includes a transparent section which indicates a plurality of symbols on the first indicator plate.

Referring to FIG. 10A, a further embodiment of the present invention is illustrated where the gaming device includes two symbol indicator plates, a first plate 200 and a second plate 202. The first plate 200 includes a plurality of symbols 204. A plurality of awards are associated with the symbols. The second plate 202 includes a transparent section 206 while the remaining portion or section of the plate is opaque or substantially non-transparent. As shown in FIG. 10A, the second plate 202 overlaps the first plate 200. In one embodiment, the second plate 202 rotates in a counter clockwise direction as indicated by the arrow 205, while the first plate 200 remains stationary. After the second plate stops spinning, the transparent section of the second plate indicates one or more symbols on the first plate. The gaming device then randomly selects one of the indicated symbols in the transparent section and provides an award associated with the selected indicated symbol to the player. In one example, the gaming device or the player activates or spins the second plate 202. The second plate stops spinning and the transparent section 206 on the second plate indicates two symbols 204 on the first plate 200. The gaming device then randomly selects one of the indicated symbols, symbol 208, and provides an award of ten associated with this symbol to the player. In another embodiment, the gaming device provides the awards associated with all of the indicated symbols in the transparent section to the player. In one aspect of this embodiment, the gaming device sums the awards associated with the indicated symbols and provides the summed award to the player. In another aspect, the gaming device multiplies the awards associated with the indicated symbols and provides the multiplied award to the player. In addition, it should be appreciated that the first plate may remain stationary while the second plate rotates, the second plate may remain stationary while the first plate rotates or both the first and second plates may rotate in the same or different directions.

Figure 10B:
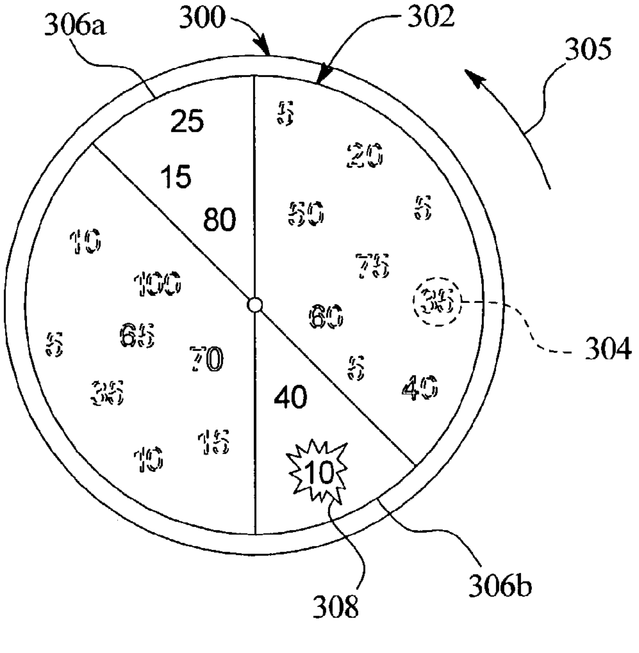
FIG. 10B is an enlarged elevation view of a further embodiment of the symbol indicator plates of the present invention where the second symbol indicator plate includes a plurality of transparent sections which indicate a plurality of symbols on the first indicator plate.

Referring now to FIG. 10B, another embodiment of the present invention is illustrated where the gaming device includes a first symbol indicator plate or first plate 300 and a second symbol indicator plate or second plate 302. The first plate 300 includes a plurality of symbols 304. Additionally, a plurality of awards are associated with the symbols. The second plate 302 includes a plurality of transparent sections such as transparent sections 306*a* and 306*b* and the remaining sections or portion of the second plate is opaque or substantially non-transparent. In this embodiment, the second plate 302 rotates or spins in a counter clockwise direction as indicated by arrow 305, while the first plate 300 remains stationary. When the second plate stops rotating or spinning, the transparent sections 306*a* and 306*b* indicate a plurality of the symbols on the first plate 300. The gaming device then randomly selects one of the symbols indicated in sections 306*a* and 306*b* and provides the award associated with the selected indicated symbol. For example in FIG. 10B, the gaming device or player activates or spins the second plate 302. When the second plate stops spinning, a plurality of symbols 304 are indicated by the transparent sections 306*a* and 306*b*. The gaming device then randomly selects one of the symbols indicated by the transparent sections, symbol 308, and provides the award of ten associated with symbol 308 to the player. It should be appreciated that one, a plurality or all of the awards associated with the symbols indicated in the transparent sections may be provided to the player. In one embodiment, the awards associated with the indicated symbols are summed and provided to the player. In another embodiment, the awards associated with the indicated symbols are multiplied and provided to the player.

In another embodiment, the gaming device randomly selects and provides one of the awards associated with the symbols indicated in an activated transparent section or sections in one or more spins in a game. In this embodiment, the gaming device may randomly determine, pre-determine or determine based on a wager made by a player, the transparent section or sections which are activated in a spin or spins in a game. In another embodiment, a player picks the transparent section or sections that are activated in a spin or spins in the game. In a further embodiment, the gaming device provides the awards to the player associated with a plurality of the symbols indicated in the activated transparent sections. In another embodiment, the gaming device provides awards associated with all of the symbols indicated in the activated transparent sections to the player. In one aspect of this embodiment, the awards are summed by the gaming device and provided to the player. In another aspect, the awards are multiplied and provided to the player.

In a further embodiment, the symbols on the first plate are positioned such that one or more areas or quadrants of the first plate include more symbols than other areas or quadrants on the first plate. In this embodiment, the transparent section or sections on the second plate indicate more symbols on the first plate in the specific areas or quadrants of the first plate that include more symbols than the areas that include less symbols. Therefore, the gaming device provides more awards to the player when the transparent section or sections of the second plate indicate areas or quadrants having more symbols. It should be appreciated that the number of awards provided to the player depends on the number of symbols included in a particular area or quadrant on the first plate and the relative position or positions of the transparent sections on the second plate.

While the present invention is described in connection with what is presently considered to be the most practical and preferred embodiments, it should be appreciated that the invention is not limited to the disclosed embodiments, and is intended to cover various modifications and equivalent arrangements included within the spirit and scope of the claims. Modifications and variations in the present invention may be made without departing from the novel aspects of the invention as defined in the claims, and this application is limited only by the scope of the claims.

The invention claimed is:

1. A gaming device comprising:

a cabinet;

a game operable upon a wager by a player;

a first plate movably mounted to the cabinet, said first plate including a plurality of scrambled symbols;

a second plate movably mounted to the cabinet, said second plate including a plurality of sections, wherein at least one of said sections includes an unscrambler for decoding at least one of the scrambled symbols of said first plate so that said symbols become discernable to the player, wherein said second plate is positioned adjacent to and overlaps at least a portion of the first plate, and wherein the first and second plates are in different planes; and an award associated with at least one of the scrambled symbols of the first plate, said award provided to the player when said scrambled symbol is unscrambled by the unscrambler of the second plate.

2. The gaming device of claim 1, wherein at least one of said sections of the second plate includes an unscrambler for decoding a plurality of the scrambled symbols of said first plate.

3. The gaming device of claim 1, wherein at least one of said sections of the second plate includes an unscrambler for decoding all of the scrambled symbols of said first plate.

4. The gaming device of claim 1, wherein a plurality of said sections of the second plate includes an unscrambler for decoding at least one of the scrambled symbols of said first plate.

5. The gaming device of claim 1, wherein each of the sections of the second plate includes an unscrambler for decoding at least one of the scrambled symbols of said first plate.

6. The gaming device of claim 1, which includes awards associated with a plurality of the scrambled symbols of the first plate.

7. The gaming device of claim 1, which includes an award associated with each of the scrambled symbols of the first plate.

8. The gaming device of claim 1, which includes different awards associated with a plurality of the scrambled symbols of one section of the first plate.

9. A gaming device comprising:

a cabinet;

a game operable upon a wager by a player;

a first plate movably mounted to the cabinet, said first plate including a plurality of symbols;

a second plate movably mounted to the cabinet, said second plate being substantially transparent and including a plurality of movable sections, wherein said second plate is positioned adjacent to the first plate such that at least two of the sections at least partially overlap the symbols of the first plate, and wherein the first and second plates are in different planes; and at least one outcome associated with one of the symbols of the first plate, said outcome provided to the player when said symbol is overlapped and indicated by a designated section from the plurality of sections of the second plate.

10. The gaming device of claim 9, wherein the designated section is randomly determined.

11. The gaming device of claim 9, wherein the designated section is predetermined.

12. The gaming device of claim 9, wherein the designated section is determined based on a wager made by the player.

13. The gaming device of claim 9, wherein the designated section is selected by the player.

14. The gaming device of claim 9, wherein upon a triggering event in the game, the first plate is stationary and the second plate moves relative to the first plate.

15. The gaming device of claim 9, wherein upon a triggering event in the game, the second plate is stationary and the first plate moves relative to the second plate.

16. The gaming device of claim 9, wherein upon a triggering event in the game, both the first and second plates move relative to each other.

17. The gaming device of claim 9, wherein the first plate and the second plate include mechanical wheels.

18. The gaming device of claim 9, wherein at least one of the first plate and the second plate include a transparent liquid crystal display.

19. The gaming device of claim 9, wherein the sections of the second plate include different colors.

20. The gaming device of claim 19, wherein all of the awards associated with any symbols indicated by at least one section including a designated color are provided to a player.

21. The gaming device of claim 20, which includes an input which enables the player to pick the designated color.

22. The gaming device of claim 9, wherein a plurality of the outcomes associated with the symbols of the first plate are provided to the player when the symbols are indicated by the designated section of the second plate.

23. The gaming device of claim 9, wherein the first plate includes a plurality of scrambled symbols and wherein an outcome associated with one of the scrambled symbols is provided to the player when the scrambled symbol is unscrambled by the designated section of the second plate so that said symbols become discernable to the player.

24. The gaming device of claim 9, wherein the first plate includes a plurality of areas, and which includes a greater number of symbols in one of the areas than in at least one of the other areas.

25. The gaming device of claim 9, wherein the first plate includes a plurality of areas, and which includes a greater number of symbols in one of the areas than in a plurality of the other areas.

26. The gaming device of claim 9, wherein the first plate includes a plurality of areas, and which includes a greater number of symbols in one of the areas than in each of the other areas.

27. A gaming device comprising:

a cabinet;

a game operable upon a wager by a player;

a first plate movably mounted to the cabinet, said first plate including a plurality of symbols;

a second plate movably mounted to the cabinet, said second plate being substantially transparent and including a plurality of movable sections having an activatable section, wherein said second plate is positioned adjacent to the first plate such that at least two of the sections at least partially overlap the symbols of the first plate, and wherein the first and second plates are in different planes; and an outcome associated with one of the overlapped symbols of the first plate, said outcome provided to the player when the activatable section is activated and said symbol is indicated by the activated section.

28. The gaming device of claim 27, wherein the activatable section is randomly activated.

29. The gaming device of claim 27, wherein the activatable section is activated based on a wager made by the player.

30. The gaming device of claim 27, wherein a plurality of outcomes associated with a plurality of the symbols of the first plate are provided to the player when the symbols are indicated by the activated section of the second plate.

31. The gaming device of claim 27, wherein the sections of the second plate include a plurality of activatable sections.

32. The gaming device of claim 31, wherein an outcome associated with one of the symbols of the first plate is provided to the player when a plurality of the activatable sections are activated and the symbol is randomly selected from a plurality of symbols indicated by the activated sections.

33. The gaming device of claim 31, wherein a plurality of outcomes associated with a plurality of symbols of the first plate are provided to the player when a plurality of the activatable sections are activated and the symbols are indicated by the activated sections.

34. The gaming device of claim 33, wherein the outcomes include awards which are summed and provided to the player.

35. The gaming device of claim 33, wherein the outcomes include awards which are multiplied and provided to the player.

36. A method of operating a gaming device including a cabinet which includes a game operable upon a wager by a player, the method comprising:

(a) moving a first plate mounted to the cabinet, said first plate including a plurality of symbols;

(b) moving a second plate mounted to the cabinet, said second plate being substantially transparent and including a plurality of sections, wherein said second plate is positioned adjacent to the first plate such that at least two of the sections at least partially overlap the symbols of the first plate, and wherein the first and second plates are in different planes;

(c) stopping the movement of the first and second plates to indicate one of the symbols of the first plate with a designated overlapping section of the second plate; and (d) providing any outcome associated with said indicated symbol of the first plate to the player.

37. The method of claim 36, which includes the step of randomly determining the designated section.

38. The method of claim 36, which includes the step of pre-determining the designated section.

39. The method of claim 36, which includes the step of determining the designated section based on a wager made by the player.

40. The method of claim 36, which includes the step of enabling the player to select the designated section.

41. The method of claim 36, wherein upon a triggering event in the game, the second plate moves relative to the first plate.

42. The method of claim 36, wherein upon a triggering event in the game, the first plate moves relative to the second plate.

43. The method of claim 36, wherein upon a triggering event in the game the first and second plates move relative to each other.

44. The method of claim 36, wherein the sections of the second plate include different colors.

45. The method of claim 44, wherein the step of providing any outcome to the player includes providing any outcomes to the player associated with the sections including a designated color.

46. The method of claim 45, which includes enabling the player to select the designated color.

47. The method of claim 36, wherein the first and second plates include first and second mechanical wheels.

48. The method of claim 47, wherein upon a triggering event in the game, the first wheel moves relative to the second wheel.

49. The method of claim 47, wherein upon a triggering event in the game, the second wheel moves relative to the first wheel.

50. The method of claim 47, which upon a triggering event in the game, includes simultaneously rotating the first and second wheels.

51. The method of claim 47, which upon a triggering event in the game, includes the step of alternately rotating the first and second wheels.

52. The method of claim 36, wherein the first plate includes scrambled symbols.

53. The method of claim 52, which includes the step of unscrambling one of the scrambled symbols when the scrambled symbol is indicated by the designated section on the second plate so that said symbols become discernable to the player.

54. The method of claim 36, wherein the steps (a) to (d) are controlled through a data network.

55. The method of claim 54, wherein the data network is an internet.

56. A method of operating a gaming device including a cabinet and a game operable upon a wager by a player, the method comprising:

(a) moving a first plate mounted to the cabinet, said first plate including a plurality of codes;

(b) moving a second plate mounted to the cabinet, said second plate being substantially transparent and including a plurality of sections, wherein said second plate is positioned adjacent to and overlaps at least a portion of the first plate, and wherein the first and second plates are in different planes;

(c) stopping the movement of the first and second plates to indicate one of the codes on the first plate with a designated section on the second plate;

(d) revealing a symbol associated with the indicated code on the first plate; and (e) providing any outcome associated with the revealed symbol to the player.

57. The method of claim 56, which includes the step of randomly determining the designated section.

58. The method of claim 56, which includes the step of pre-determining the designated section.

59. The method of claim 56, which includes the step of determining the designated section based on a wager made by the player.

60. The method of claim 56, which includes the step of enabling the player to select the designated section.

61. The method of claim 56, which includes the step of revealing a plurality of symbols associated with the indicated code of the first plate and providing any outcomes associated with the revealed symbols to the player.

62. The method of claim 56, wherein the steps (a) to (e) are controlled through a data network.

63. The method of claim 62, wherein the data network is an internet.

64. A gaming device comprising:

a cabinet;

a game operable upon a wager by a player;

a first plate movably mounted to the cabinet, said first plate including a plurality of symbols;

a second plate movably mounted to the cabinet, said second plate being substantially transparent and including a plurality of movable sections, said sections including different colors, wherein said second plate is positioned adjacent to the first plate such that at least two of the sections at least partially overlap the symbols of the first plate, and wherein the first and second plates are in different planes;

an input device operable to enable the player to pick a designated color; and at least one outcome associated with one of the symbols of the first plate, said outcome provided to the player when said symbol is overlapped and indicated by a designated section having the designated color from the plurality of sections of the second plate.

65. A gaming device comprising:

a cabinet;

a game operable upon a wager by a player;

a first plate movably mounted to the cabinet, said first plate including a plurality of symbols;

a second plate movably mounted to the cabinet, said second plate being substantially transparent and including a plurality of activatable sections, said second plate positioned adjacent to the first plate such that at least two of the sections at least partially overlap the symbols of the first plate, and wherein the first and second plates are in different planes; and an outcome associated with one of the symbols of the first plate, said outcome provided to the player when a plurality of the activatable sections are activated and the symbol is randomly selected from a plurality of symbols overlapped and indicated by the activated sections.

66. The gaming device of claim 65, wherein a plurality of outcomes associated with a plurality of symbols of the first plate are provided to the player when a plurality of the activatable sections are activated and the symbols are indicated by the activated sections.

67. The gaming device of claim 66, wherein the outcomes include awards which are summed and provided to the player.

68. The gaming device of claim 66, wherein the outcomes include awards which are multiplied and provided to the player.

69. A method of operating a gaming device including a cabinet which includes a game operable upon a wager by a player, the method comprising:

(a) enabling the player to select a designated color;

(b) moving a first plate mounted to the cabinet, said first plate including a plurality of symbols;

(c) moving a second plate mounted to the cabinet, said second plate being substantially transparent and including a plurality of sections including different colors, said second plate positioned adjacent to the first plate such that at least two of the sections at least partially overlap the symbols of the first plate, and wherein the first and second plates are in different planes;

(d) stopping the movement of the first and second plates to indicate one of the overlapped symbols of the first plate with a designated section of the second plate, said designated section of the second plate having the designated color; and (e) providing any outcome associated with said indicated symbol of the first plate to the player.

* * * * *